United States Patent [19]

Gvoich et al.

[11] Patent Number: 4,625,960
[45] Date of Patent: Dec. 2, 1986

[54] FLUID TYPE ABDUCTOR-ADDUCTOR EXERCISE DEVICE

[76] Inventors: William Gvoich, 281 Rainbow Dr., Hamilton, Ontario, Canada, L8K 4G3; John B. Rogers, R.R. #1, Hunts Point, Queens County, Nova Scotia, Canada, B0T 1G0

[21] Appl. No.: 711,751

[22] Filed: Mar. 14, 1985

[51] Int. Cl.⁴ .............................................. A63B 21/00
[52] U.S. Cl. ..................................... 272/130; 137/597; 188/299
[58] Field of Search ................. 272/130, 143, DIG. 1, 272/93, 116; 137/597; 188/285, 299, 319

[56] References Cited

U.S. PATENT DOCUMENTS

| | | | |
|---|---|---|---|
| 3,174,343 | 3/1965 | Kasulis | 272/130 X |
| 3,471,145 | 10/1969 | Berger | 272/DIG. 1 X |
| 3,606,318 | 9/1971 | Gilstrap | 272/130 |
| 3,702,188 | 11/1972 | Phillips et al. | 272/DIG. 1 X |
| 3,784,194 | 1/1974 | Perrine | 272/130 X |
| 3,836,141 | 9/1974 | Franklyn | 272/130 |
| 3,976,057 | 8/1976 | Barclay | 272/130 X |
| 4,240,627 | 12/1980 | Brentham | 272/130 |
| 4,444,390 | 4/1984 | Erickson | 272/130 |
| 4,452,447 | 6/1984 | Lepley et al. | 272/130 X |
| 4,525,153 | 6/1985 | Wilson | 188/258 X |
| 4,579,143 | 4/1986 | Rollins et al. | 137/597 X |

FOREIGN PATENT DOCUMENTS 0157763 12/1982 German Democratic Rep. ..................................... 272/130

Primary Examiner—Richard J. Apley
Assistant Examiner—Robert W. Bahr
Attorney, Agent, or Firm—Riches, McKenzie & Herbert

[57] ABSTRACT

An exercise device designed to exercise the inner and outer thigh and hip areas, namely, the adductor-abductor muscles. A pair of knee rests are operably connected to separate air cylinders and a new valve module is provided which adjusts the amount of air within each air cylinder thus bearing the amount of resistance of the exercise. The device is particularly suitable for use in the prevention and rehabilitation of groin injuries and provides for gradual stretching and restoration of the normal range of motion as well as strength. The device is based on the principle of the use of air as the resistance medium and uses no auxiliary fluid supply.

14 Claims, 8 Drawing Figures

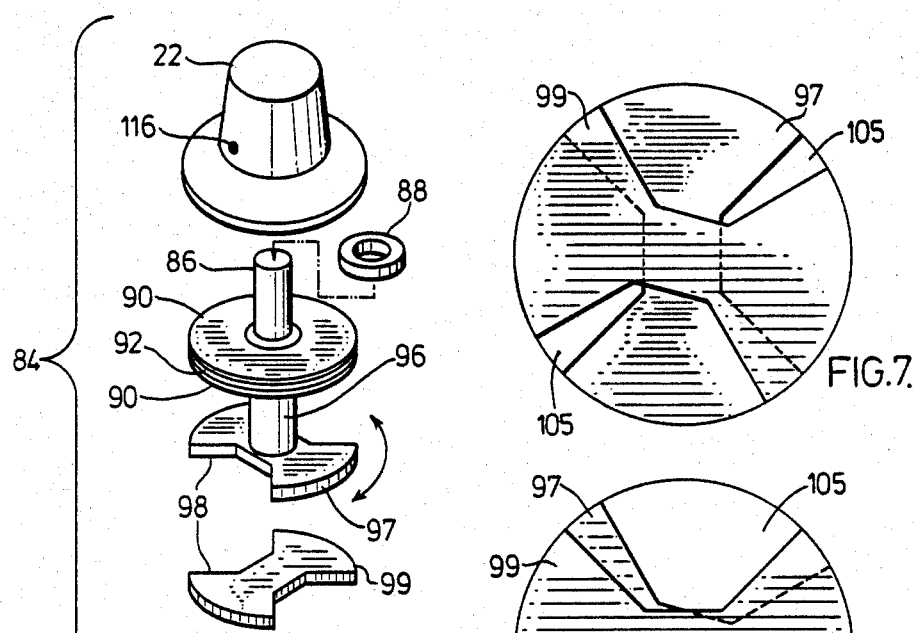
FIG 6
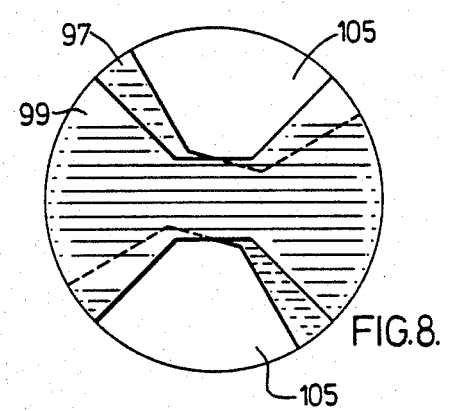
FIG.7.
FIG.8.
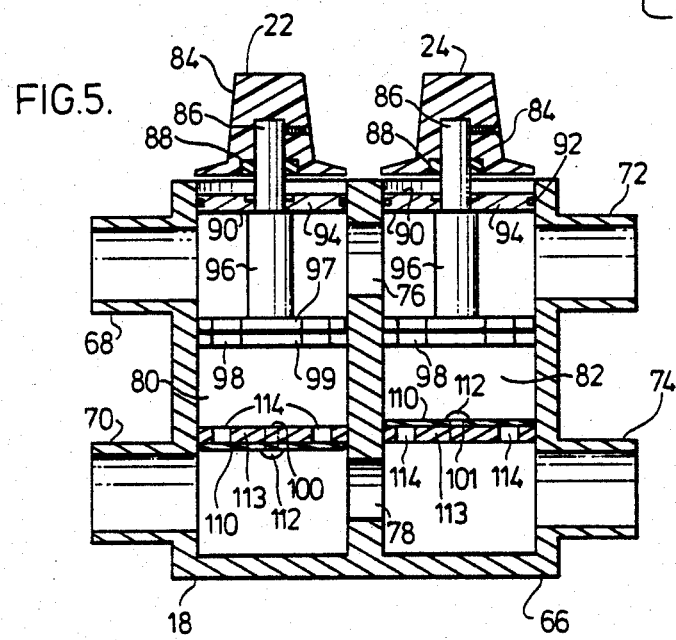
FIG.5.

FLUID TYPE ABDUCTOR-ADDUCTOR EXERCISE DEVICE

BACKGROUND OF THE INVENTION

1. Field of the Invention

This invention relates generally to a new exercise device and more particularly, to a new exercise device designed to exercise the inner and outer thigh and hip areas, namely, the adductor-abductor muscles.

2. Description of the Prior Art

In designing strength or exercise training equipment, specific consideration must be made of the type of action which the joint or muscle is capable of in order to understand the particular problems which may arise and to design equipment which will alleviate these problems and strengthen the muscle, and increase the stability of the joint.

The present device is particularly suitable for use in developing, rehabilitating and strengthening the inner and outer thigh and hip areas and is applicable to a number of athletic fields. The hip joint is capable of many different types of movements, including, inter alia, flexion, extension, adduction, abduction, circumduction and rotation and various muscles are involved in each of these movements. In particular, with respect to adduction, the muscles involved include the hamstring muscles, pectineus, gracilis, adductor magnus, adductor longus, adductor brevis and lower fibers of the gluteus maximus. Abduction involves the use of the tensor fasciae latae, sartorius, gluteus medius and the gluteus minimus.

The present device has been designed specifically to act on these adductor and abductor muscles with the view to prevent injuries from occurring and to rehabilitate the muscles following occurrence of an injury.

One of the most common injuries which may occur is referred to as "groin strain". The groin is the depression which lies between the thigh and the abdominal region and the musculature in this area includes the iliopsoas, the rectus femoris and the adductor group (the gracilis, pectineus, adductor brevis, adductor longus, and the adductor magnus). Any one of these muscles can be torn or overextended in a sporting activity or otherwise, and this is commonly referred to as a "groin strain". This injury commonly occurs in sports which involve running, jumping or twisting with external rotation such as ice hockey, football, track and field and the like.

Some attempts have been made to study the cause of groin strain injuries and methods of exercise which will reduce the occurrence of such injuries. In a study by H. H. Merrifield et al., The Journal of Sports Medicine, Jan/Feb. 1973 at p. 41, it was concluded following a study of groin strain injuries which occurred in the sport of ice hockey, that "strengthening and stretching exercises of the adductor muscles of the thigh would be useful in eliminating power imbalance between limbs and thereby help to prevent groin strain injury". In this study, it was found that all players who reported groin strains, exhibited injuries to the adductor muscle groups and as a result, it was concluded that the players who had complained of "groin strain" had probably sustained an injury to the adductor muscle group of the affected limb. This muscle group was the major site of muscle strain in professional athletes as reported by J. P. Curran: *Premier of Sports Medicine*, Springfield, Ill., Charles C. Thomas Company, 1968.

In the past, various persons have designed and sold exercise machines which act directly on the hip joint. However, these machines generally suffer from the drawback that they do not allow for a full range of motion in both abduction and adduction. Also, many of these machines require the user to use the device in the sitting position which inhibits full range of movement and restricts the variety of motion available to the user.

Other machines on the market today involve cumbersome and expensive equipment which is located at training facilities, health clubs and the like and are not adaptable for home use.

SUMMARY OF THE INVENTION

Accordingly, it is an object of the present invention to at least partially overcome these disadvantages by providing a device which will prevent the occurrence of groin strain by increasing the user's strength and flexibility in the groin areas.

It is a further object of the present invention to provide a device which is suitable for use in the prevention and rehabilitation of groin injuries.

It is a still further object of the present invention to provide a device which reconditions the groin area of a person through gradual stretching and restoration of the normal range of motion as well as strength.

A further object of the present invention is to provide a device which is simple in design and which may be manufactured for home use.

It is yet a further object of this invention to provide a light-weight and portable exercise device.

Another object of this invention is to provide an adductor-abductor exercise device which uses no auxiliary fluid supply means and is completely self-contained and easy to operate.

It is yet a further object of this invention to provide a device which conditions and strengthens the adductor and abductor muscles through their full range of motion to maximize fitness and prowess.

To this end, in one of its aspects, the invention provides an adductor-abductor exercise device which comprises a pair of actuator means, a pair of connecting means, each connecting means connecting one of said actuator means to a piston adjustably engageable within an air cylinder, and a valve means adapted to vary the resistance to the movement of air within the device.

In another of its aspects, the invention provides an abductor-adductor exercise device which comprises a pair of knee rests, each knee rest adapted to accommodate a human knee, a pair of bushing blocks, each block attached to one of said knee rests, and adapted to be moved in a lateral direction in response to the movement of each knee rest, a guide means adapted to guide the movement of each bushing block, a pair of connecting rods, each connecting rod attached to one of said blocks, a pair of piston rods, each piston rod attached to one of said connecting rods, a pair of air cylinders, a pair of pistons, each piston attached to one end of one of said piston rods and adapted to move laterally along the length of one of said air cylinders, a valve module adapted to control the resistance of the flow of air in said device, a conduit located at each end of said cylinder and communicating with said valve module.

Further objects and advantages of the invention will appear from the following description taken together with the accompanying drawings.

BRIEF DESCRIPTION OF THE DRAWINGS

FIG. 5 is a sectional view of the valve module of the present invention;

FIG. 6 is an exploded view of the shut-off valve of the present invention;

FIG. 7 is a bottom view of the sliding valve in one position;

FIG. 8 is a bottom view of the sliding valve in a second position.

DESCRIPTION OF THE PREFERRED EMBODIMENT

Figure 1:
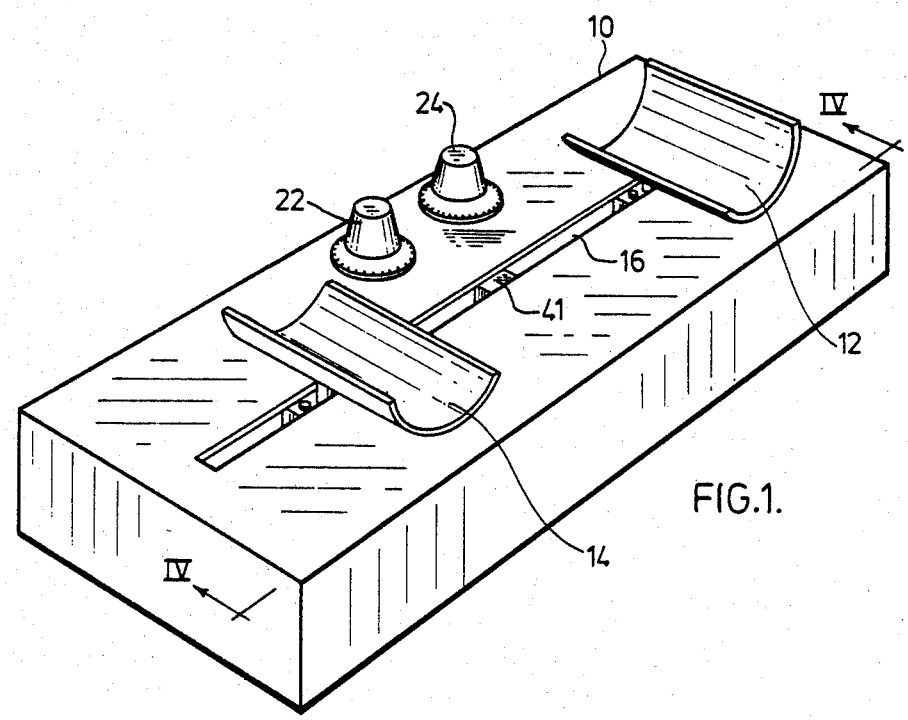
FIG. 1 is a top plan view of the abductor-adductor exercise device of the present invention.
Figure 2:
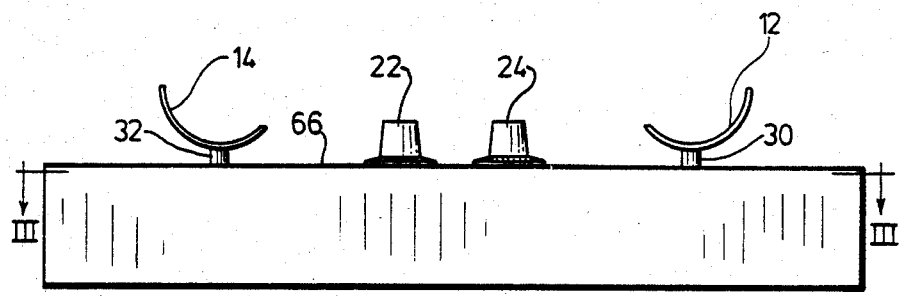
FIG. 2 is a side elevational view thereof.
Figure 3:
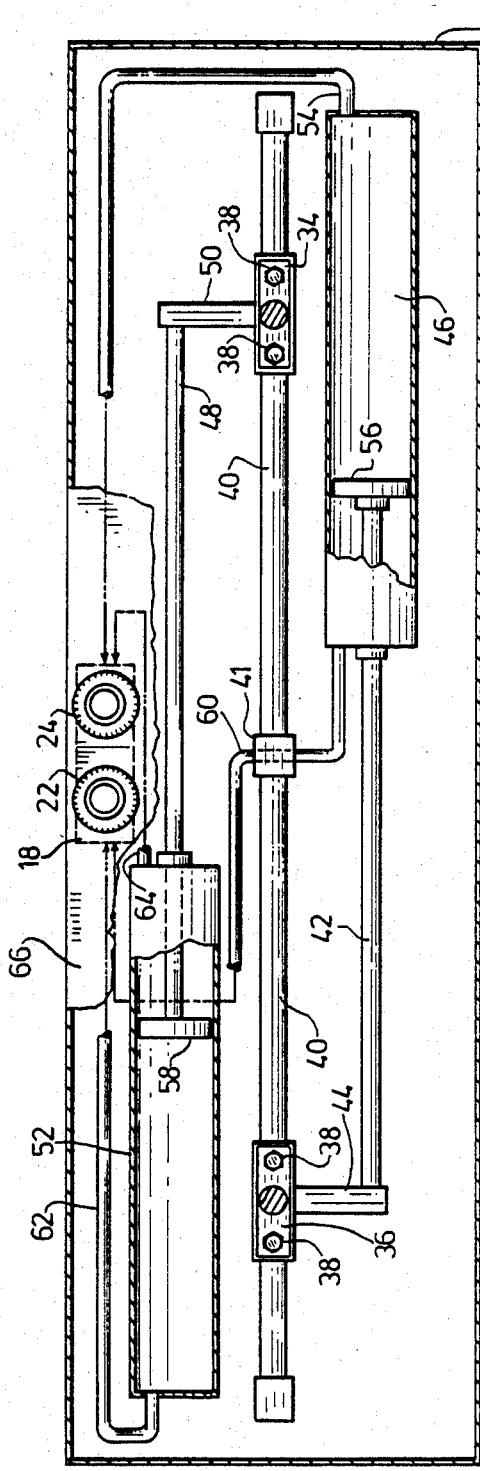
FIG. 3 is a partial sectional view along line III—III of FIG. 2.
Figure 4:
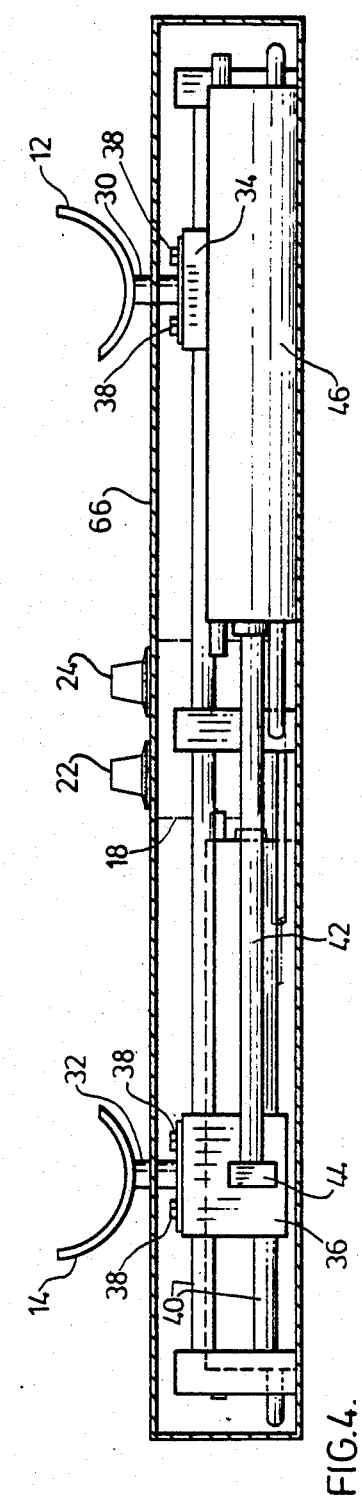
FIG. 4 is a side elevational sectional view along line IV—IV of FIG. 1.

Referring first to FIGS. 1 and 2, the device of the present invention comprises a casing 10 and a pair of rests 12, 14 which extend upwardly through a slot 16. The rests 12, 14, are generally concave in profile, the purpose of which will be explained hereinafter. On the top surface of the casing 10 near the front edge and between rests 12, 14, is located the top of valve module 18 (not shown) which is adjustable by the movement of knobs 22, 24. FIGS. 3 and 4 show the interior of the casing 10 and the mechanism of the present device. Rests 12, 14 are mounted preferably on pedestals 30, 32 respectively which in turn are mounted on bushing blocks 34, 36 by screws 38 or by any other suitable means well known in the art. The bushing blocks 34, 36 slide freely on guide rods 40 in either direction. A stopping means 41 is located at the centre of rods 40 to prevent any cross-over of bushing blocks 34, 36.

The bushing block 36 is affixed to a first piston rod 42 via first connecting rod 44 and first piston rod 42 extends into first air cylinder 46 and terminates at first piston 56.

The bushing block 34 is affixed to a second piston rod 48 via second connecting rod 50 and second piston rod 48 extends into a second air cylinder 52 and terminates at second piston 58.

Hose 54 communicates at one end of air cylinder 46 to valve module 18; hose 60 communicates the opposite end of the air cylinder 46 to valve module 18; hose 62 communicates one end of cylinder 52 to valve module 18 and hose 64 communicates the opposite end of cylinder 52 to valve module 18.

The operation of the device will now be explained. The device is designed primarily as an exercise unit to exercise the inner and outer thigh areas. In operation, the user of the device kneels on the device with his knees in rests 12, 14. These rests 12, 14 are designed to accommodate the knees of the user in the most comfortable manner as possible. The rests 12, 14 are preferably concave in profile (see FIG. 2) and may or may not be padded.

The adductor and abductor muscles are exercised by moving the rests 12, 14 apart and then together or vice versa, either singly or together. The rests 12, 14 slide on the guide rods 40 and thus can be moved in either direction. The air cylinders 46, 52 are connected via hoses 54, 60, 62 and 64 to valve module 18 which enable the user to vary the level of resistance encountered in either phase of the exercise movement.

The medium providing the resistance when the device is used, is the air contained in the two air cylinders 46, 52. It is noted that no external or auxiliary fluid is used to create this resistance and thus, the problems of the prior art including leakage, supply of fluid, and weight of the fluid, have been eliminated.

The degree of resistance to the exercise depends upon the pressure of the air within each cylinder. This pressure is controlled by the valve module 18, which controls the amount of air located within each air cylinder and on each side of pistons 56, 58.

Piston rods 42, 48 reciprocably move within respective air cylinders 46, 52 and carry a piston 56, 58 at their terminal ends. If desired, the pistons 56, 58 carry seals about their circumference. As the rests 12, 14 are moveable in either direction, the piston rods 42, 48 will move accordingly with the respective air cylinders by the movement of the bushing blocks 34, 36 thereby altering the pressure of the air within the cylinders. The user will work against the resistance of the valve module setting for a particular movement.

The specific operation of the device will now be explained. For the abduction exercise, the user places his knees in rests 12, 14 and faces the knobs 22, 24. The user then moves his knees laterally outwardly away from his body. This causes each of the bushing blocks 34, 36 to move laterally outwardly and the bushing blocks 34, 36 then cause the respective piston rods 48, 42 to move and pull the pistons 58, 56 laterally inwardly towards the centre of the device. The air is forced by the action of the pistons 58, 56 through hoses 64, 60 to valve module 18, where it is then drawn into the opposite pair of cylinder chambers through hoses 62 and 54.

By opening or closing the valve module 18 or partially opening or closing same, the air pressure in this system is varied during use and accordingly, the resistance felt by the user during this exercise may also be varied.

For the adduction exercises, the user places his knees in rests 12, 14 and faces the knobs 22, 24. The user then moves his knees laterally inwardly towards his body. This causes each of the bushing blocks 34, 36 to move laterally inwardly and the bushing blocks 34, 36 then cause the respective piston rods 48, 42 to move and push the piston 58, 56 laterally outwardly towards the sides of the device. Thus, air is forced by the action of the pistons 58, 56 through hoses 54, 62 to valve module 18, where it is transferred via hoses 60, 64 to the opposite cylinder chambers.

By opening or closing the valve module 18 or partially opening or closing same, the air pressure in this system is varied and accordingly, the resistance felt by the user during this exercise will be in accordance to this.

The ends of each air cylinder 46, 52 through which piston rods 42, 48 extend are sealed to prevent any leakage of air. Suitable seals and sealing rings may be used. Similarly, pistons 56, 58 preferably carry seals about their periphery to prevent any air leakage across the pistons 56, 58.

One of the significant advantages of the present invention is that it allows the user to exercise one leg or both legs simultaneously. It is also adaptable to be use in a variety of positions and therefore gives the user a full range of motion, up to and including a full split position.

A simple locking device may be affixed to one of the other of the rests 12, 14 to lock the rest in the desired position on rods 40. Thus, the user can operate the device using only a single rest and this may be easily reversed to exercise either leg.

The operation of the device is based on the cushioning effect of air and by adjusting the resistance of the unit, the user can proceed as quickly or as slowly as desired. This action is directly opposite to the ballistic effect caused by the use of free weights. By allowing such adjustments, a faster recovery after injury is experienced by the user and no knee damages can occur since no pressure is exerted on the knees of the user.

The system may be adapted to an individual's specification, thus allowing for variable resistance in the system. The present invention also allows for biomechanical accommodation, that is, it allows for a variation in the resistance in the system in conjunction with the strength curve required by the particular exercise and by the particular athlete.

Various alterations made must be made to the structure of this exercise device within the spirit and scope of the present invention.

Rests 12, 14 may vary in shape and size although it is preferred that they be of such a shape and size to accommodate the knees of the user of the device in the most comfortable position. A further variation is that gauges may be present to measure the air pressure at any point in the system, to notice the necessary comparisons or measurements in absolute or relative terms.

The specific operation of the valve module 18 will now be described. In one of the original embodiments, check valves were used on the ends of each of the cylinders. These check valves were used to allow ambient air to enter and to recharge the system, and to exhaust the air back to the environment. Although these check valves proved satisfactory, they were very noisy in operation and required a rather detailed and complex system.

Accordingly, a more preferred embodiment was designed using a new valve module which overcome these problems. This new valve module enables the air circuits to be completely self-contained with the present device. They have proved very quiet during use and simplifies the entire structure of the device.

The flow of the air alternates back and forth through the hoses as the user forces the movement of the air from one pair of cylinder chambers on the other side of the piston. In order to achieve this, the air flow must first pass through the valve module 18 which regulates the amount of resistance for either phase of the exercise movement.

The valve module 18 achieves this by using two pairs of valves, each valve in itself comprising two valves, namely, a shut-off valve and a check valve.

FIGS. 5 to 8 show the structure of the preferred embodiment of the valve module 18. Referring first to FIG. 5, there is shown a sectional view of the preferred embodiment of the valve module 18. The valve module 18 comprises a valve casing 66 from which extend four short tubular openings 68, 70, 72, 74 to which hoses 62, 60, 54 and 64 are attached respectively. Upper channel 76 extends between openings 68, 72 and lower channel 78 extends between openings 70, 74. Vertical channels 80, 82 communicate between each of the valves as will be explained hereinafter.

Each of the two shut-off valves 84 are identical and will be explained with particular reference to FIGS. 5 and 6. The shut-off valve 84 comprises a knob 22 (or 24) which is mounted on a post 86 over spacer washer 88 which allows the knob 22 (or 24) to be rotated freely without any frictional contact with the top surface of the casing 66. A disc 90 carries O-ring 92, made preferably of rubber, in a peripheral groove to form seal 94 which acts as a seal to prevent any leakage of air through the top of vertical channels 80, 82. The seal 94 sits on an enlarged post 96 which terminates in a circular, sliding valve 98. The sliding valve 98 comprises a movable plate 97 and a stationary plate 99, each of which carries apertures therein which are adopted such that when juxtaposed in a preselected position, allow for complete closure of the aperture(s), a channel through said plates to be formed to allow complete transmission across the sliding valve 98, or an infinite number of variations between the two positions of open or closed.

The stationary plate 99 is fixed in the base of the channels 80, 82 below the plane of the bottom of the channel 76. It may be press fit in place or secured therein by any means well known in the art. The stationary plate 99 may be of any desired shape as long as there is at least one aperture therethrough which allows for the passage of air.

Similarly, the shape of the movable plate 97 may be of any desired shape and size as long as it will allow for the passage of air therethrough. The only limitations as to the shapes and sizes is that when module 18 is assembled, the action of both the movable plate 97 and the stationary plate 99 is such to allow for complete passage of air therethrough, no passage of air therethrough, or an infinite number of variations therebetween.

One example of a suitable shape is that shown in FIGS. 6, 7 and 8. In these drawings, the movable plate 97 and the stationary plate 99 are shown as circular plates with truncated radial portions therein. Thus, when the two plates are aligned such that when the solid portions of plate 97 overlay the open areas of plate 99, it forms a solid barrier to the flow of air. In the case when the two areas of the plates are aligned, the system will be open thus allowing passage of air. In the partial open (or partial closed) position as shown in FIGS. 7 and 8, the size of the apertures or channels through the plate is reduced thus restricting the flow of air therethrough. The degree of openess is controlled by the position of the knob 22 (or 24) which is releasably secured to the post 86 by grub screw 116 or similar means. By turning knob 22 (or 24), post 86 turns which in turn controls the movement and orientation of plate 97 and accordingly, the size of the apertures 105.

The check valves inside the valve module 18 each comprise a rubber valve disc 110 which is secured by a screw 112 to seat 113. Channels 114 are formed in the valve itself. Check valve 100 is orientated in the opposite direction to check valve 101. In the preferred embodiment, channels 114 are displaced in a circular pattern in seat 113 around screw 112 thus providing a plurality of channels 114. As seen in FIG. 5, when air is forced through vertical channel 80 in the downward direction, it will pass through channels 114 forcing the disc 110 away from the seat 113 thus allowing passage of the air therethrough. Air cannot pass in the opposite direction since disc 110 will be forced against seat 113 thus closing off channels 114. Similarly, check valve 101 will allow passage of air only upwardly through the vertical channel 82 as with air passing in this direction, the disc 110 will be forced away from the seat 113 to open channels 114. In the opposite direction, disc 110 will be forced against seat 113 closing off channels 114. Check valves 100, 101 are press fit into the upper plate channels immediately above lower channel 78. They may, if desired, be secured in place by any means well known in the art.

The knobs 22, 24 may take any desired form within the spirit and scope of the present invention. For example, knobs 22, 24 may take the form of or be used in conjunction with gauges which measure the air resistance in the system and which allow the user to compare settings from one exercise period to another. A second embodiment includes knobs 22, 24 carrying indicia thereon which indicate an open or a closed position which will be explained hereinafter.

A third embodiment of the knobs includes knobs as truncated conical bodies with a plurality of numbers spaced around a skirt portion about the base of the knob.

The operation of the valve module will now be explained. For adduction exercises, as explained hereinbefore, the air is forced through hoses 54, 62 to valve module 18. The air enters the module 18 through openings 68, 72 and enters upper channel 76. The air is then forced through vertical channel 80, through check valve 100 and into lower channel 78 where it exits through openings 70, 74 into hoses 60, 64 respectively. The air cannot pass through check valve 101 as where the air is forced down through channel 82, it forces the disc 110 against seat 113 thereby closing off channels 114. By adjusting the size of the apertures 105 in the shut-off valve 84 which is in channel 80, the amount of resistance to the movement of the air can be varied and accordingly, the degree of difficulty of the exercise. The size of the apertures 105 is controlled by movement of the knob 22 as explained hereinbefore.

For the abduction exercise, as explained hereinbefore, the air is forced through hoses 60, 64 to valve module 18. The air enters the module 18 through openings 70, 74 and enters lower channel 78. The air is then forced through vertical channel 82, through check valve 101 and into upper channel 76 where it exits through openings 68, 72 into hoses 54, 62 respectively. The air cannot pass through check valve 100 as when the air is forced up through channel 80, it forces the disc 110 against seat 113 thereby closing off channels 114. By adjusting the size of the apertures 105 in the shut-off valve 84 which is in channel 82, the amount of resistance to the movement of the air can be varied and accordingly, the degree of difficulty of the exercise. The size of the apertures 105 is controlled by movement of the knob 24 as explained hereinbefore.

Although the disclosure describes and illustrates a preferred embodiment of the invention, it is to be understood that it is not restricted thereto.

What we claim is:

1. An abductor-adductor exercise device which comprises a pair of actuator means, a pair of connecting means, a pair of air cylinders, each air cylinder having a piston adjustably engageable therein, each connecting means connecting one of said actuator means to one of said pistons, a valve module for varying the resistance to the movement of air within the device and pneumatic connection means pneumatically connecting said valve module to said pair of air cylinders, said valve module comprising two pairs of valves, each pair of valves adapted to control the flow of air through said module, each pair of valves comprising a shut-off valve and a check valve, each of said shut-off valves adapted to be opened, partially opened or closed in response to the adjustment of an external control means, and each of said check valves comprising a closure member, a seat and a securing means securing said seat to said closure member, to allow passage of air therethrough in a first or a second direction, a valve casing, an upper channel extending through the upper portion of said casing, a lower channel extending through the lower portion of said casing, a first connecting channel connecting said upper channel and said lower channel, a second connecting channel connecting said upper channel and said lower channel, one of said pairs of valves in said first connecting channel between said upper channel and said lower channel and the other of said pairs of valves in said second connecting channel between said upper channel and said lower channel.

2. An exercise device as claimed in claim 1 wherein each of said actuator means comprises a concavely-shaped knee rest, mounted on a pedestal.

3. An exercise device as claimed in claim 2 wherein each connecting means is a bushing block and a piston rod connected to one of said pistons within one of said air cylinders.

4. An exericse device as claimed in claim 1 wherein said connecting means, said pistons and said air cylinders are contained within a housing.

5. An exercise device as claimed in claim 1 wherein said pneumatic connection means are air hoses which pneumatically connect one chamber of each of said air cylinders with said valve module.

6. An abductor-adductor exercise device which comprises a pair of knee rests, each knee rest adapted to accommodate a human knee, a pair of bushing blocks, each block attached to one of said knee rests and movable in a lateral direction in response to the movement of each knee rest, a pair of guide rods for guiding the movement of each bushing block, a pair of connecting rods, each connecting rod attached to one of said blocks, a pair of piston rods, each piston rod attached to one of said connecting rods, a pair of air cylinders, a pair of pistons, each piston attached to one end of one of said piston rods and movable laterally along the length of one of said air cylinders, a valve module for controlling the resistance of the air flow in said device, pneumatic connection means pneumatically connecting said valve module to said pair of air cylinders, said pneumatic connection means comprising a conduit located at each end of each of said cylinders and pneumatically communicating with the valve module, said valve module comprising two pairs of valves, each pair of valves adapted to control the flow of air through said module, each pair of valves comprising a shut-off valve and a check valve, each of said shut-off valves adapted to be opened, partially opened or closed in response to the adjustment of an external control means, and each of said check valves comprising a closure member, a seat and a securing means, said securing means securing said seat to said closure member, to allow passage of air therethrough in a first or a second direction.

7. An exercise device as claimed in claim 6 further including a pair of gauges for measuring the air pressure with one chamber of air cylinder.

8. An exercise device as claimed in claim 6 wherein each conduit is an air hose.

9. An exercise device as claimed in claim 6 wherein one of said check valve allows passage of air therethrough in a first direction and said other check valve allows for passage of air therethrough in a second direction.

10. A device as claimed in claim 6 wherein said valve module comprises a valve casing, an upper channel extending through the upper portion of said casing, a lower channel extending through the lower portion of said casing, a first connecting channel connecting said upper channel and said lower channel, a second connecting channel connecting said upper channel and said lower channel, one of said pairs of valves in said first connecting channel between said upper channel and said lower channel and the other of said pairs of valves in said second connecting channel between said upper channel and said lower channel.

11. A valve module comprising two pairs of valves, each pair of valves adapted to control the flow of air through said module, each pair of valves comprising a shut-off valve and check valve, each of said shut-off valves adapted to be opened, partially opened, or closed in response to the adjustment of an external control means, and each of said check valves comprising a closure member, a seat and securing means, said securing means securing said seat to said closure member, to allow passage of air therethrough in a first or a second direction, said module further comprising a valve casing, an upper channel extending through the upper portion of said casing, a lower channel extending through the lower portion of said casing, a first connecting channel connecting said upper channel and said lower channel, a second connecting channel connecting said upper channel and said lower channel, one of said pairs of valves in said first connecting channel between said upper channel and said lower channel and the other of said pairs of valves in said second connecting channel between said upper channel and said lower channel.

12. A valve module as claimed in claim 11 wherein each of said shut-off valves is a sliding valve which comprises a stationary plate and a movable plate, said movable plate movable in response to the adjustment of said control means.

13. A valve module as claimed in claim 11 wherein a plurality of channels are formed in each of said check valves, said closure member being movable to open or close said plurality of channels.

14. A valve module as claimed in claim 13 wherein said closure member is a rubber disc.

* * * * *